Patented Jan. 26, 1943

2,309,196

UNITED STATES PATENT OFFICE 2,309,196

SUBSTITUTION PRODUCTS OF ANTHRAQUINONE AND THE CORRESPONDING AROYL-BENZOIC ACID AND PROCESS OF PREPARING THE SAME

Paul Kränzlein, Berlin, Germany, assignor to General Aniline & Film Corporation, a corporation of Delaware No Drawing. Application April 1, 1938, Serial No. 199,444. In Germany April 27, 1937

4 Claims. (Cl. 260—365)

The present invention relates to substitution products of anthraquinone and the corresponding aroyl-benzoic acids and to a process of preparing the same.

In U. S. Patent No. 2,281,583, issued May 5, 1942 (my copending application Ser. No. 192,564, filed February 25, 1938) there is described a process of preparing substitution products of anthraquinone and the corresponding aroyl-benzoic acids which comprises condensing a primary amine corresponding with the following general formula:

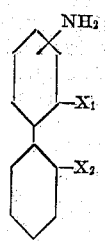

wherein the nucleus containing the amino group may contain further substituents, $X_1$ and $X_2$ represent hydrogen or together represent one of the group:

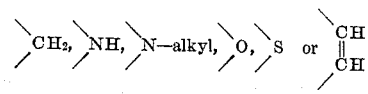

or a derivative or a salt of such an amine, in the presence of an acid condensing agent, such as aluminium chloride or zinc chloride, with phthalic anhydride or a substitution product thereof.

I have found that also amino compounds of hydrocarbons with 4 condensed rings, or derivatives or salts thereof may, in the presence of an acid condensing agent, be condensed with a phthalic anhydride or a substitution product thereof, the aroyl-benzoic acids or the corresponding anthraquinone derivatives thus being obtained as in the process of the aforesaid U. S. Patent No. 2,281,583. By this process, it is possible to prepare a further number of new substances which are valuable in the manufacture of dyestuffs.

The following examples serve to illustrate the invention, but they are not intended to limit it thereto; the parts are by weight, unless otherwise stated.

(1) 24 parts of 2-amino-chrysene of the formula:

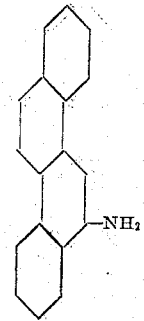

are, at 120° C., introduced, while stirring, into a melt of 250 parts of sodium chloride-aluminium chloride (1:4). The temperature is lowered to 110° C. and 20 parts of phthalic anhydride are added in small portions, care being taken that the temperature does not exceed 120° C. As soon as all of the anhydride component has been introduced, the melt is further stirred, for 15 minutes, at 120° C. Within this period of time, the corresponding benzoyl-benzoic acid has been formed nearly quantitatively. When the temperature is, thereupon, raised and the whole is further stirred, for one hour, at 140° C.–145° C., ring-closure occurs and the 2-amino-phthaloyl-chrysene of the probable constitution:

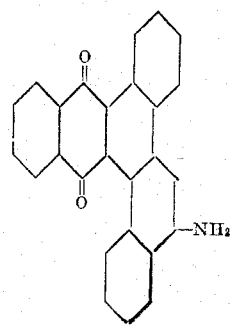

is formed.

The melt is poured on ice and worked up as usual. The dark-brown red crude product may easily be purified by sublimation. Recrystallized from trichlorobenzene, it is obtained in the form of violet needles which, at 320° C., begin to sinter and melt at 325° C. The amino-phthaloyl-chrysene dissolves in concentrated sulfuric acid to a red-violet solution and yields a red vat.

(2) 10 parts of 4-amino-fluoranthene (obtainable by nitrating fluoranthene in glacial acetic acid and reducing the nitro compound thus obtained) are, at 120° C., introduced into 120 parts of sodium chloride-aluminium chloride (1:4). The reaction mixture is allowed to cool to 110° C. and 10 parts of phthalic anhydride are added in portions. While well stirring, the temperature is first maintained, for 20 minutes, at 110° C.-115° C. and then, for one hour, at 160° C.-170° C. The melt is worked up as described above. The crude product sublimes in the form of dark-violet needles and melts at a temperature above 350° C. It dissolves in concentrated sulfuric acid to a red-violet solution and yields a purely blue vat. The new compound has probably the following constitution:

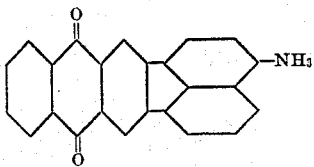

(3) 10 parts of the 3-amino-pyrene of the formula:

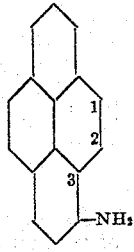

and 3 parts of phthalic anhydride are melted with 120 parts of a sodium chloride-aluminium chloride mixture (1:4). The reaction mixture is stirred, for 40 minutes, at 115° C. and, for 1½ hours, at 150° C. After working up the melt, a dark-brown crude product is obtained. The 3-amino-phthaloyl-pyrene obtained has probably the following constitution:

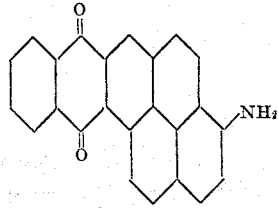

It may easily be sublimed and melts at a temperature above 350° C.

It dissolves in concentrated sulfuric acid to a blue-green solution and yields a brown vat.

I claim:

1. As a new product the compound of the formula:

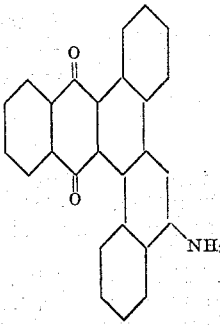

forming violet needles which melt at 325° C., dissolving in concentrated sulfuric acid to a red-violet solution and yielding a red vat.

2. The process which comprises heating for 15 minutes at 120° C. and then for 60 minutes at 140° C.-145° C., while stirring, in a sodium chloride-aluminium chloride melt, 2-amino-chrysene together with phthalic anhydride.

3. The process which comprises heating for 40 minutes at 115° C. and then for 90 minutes at 150° C., while stirring, in a sodium chloride-aluminium chloride melt, 3-amino-pyrene together with phthalic anhydride.

4. The process which comprises condensing in a sodium chloride, aluminum chloride melt a primary amine of the group consisting of 2-aminochrysene and 3-aminopyrene with phthalic anhydride.

PAUL KRÄNZLEIN.